(12) United States Patent
Tanaka

(10) Patent No.: US 11,394,873 B2
(45) Date of Patent: Jul. 19, 2022

(54) CONTROL APPARATUS, CONTROL METHOD, AND RECORDING MEDIUM

(71) Applicant: CANON KABUSHIKI KAISHA, Tokyo (JP)

(72) Inventor: Ryo Tanaka, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/023,123

(22) Filed: Sep. 16, 2020

(65) Prior Publication Data

US 2021/0092281 A1 Mar. 25, 2021

(30) Foreign Application Priority Data

Sep. 20, 2019 (JP) .............................. JP2019-172188

(51) Int. Cl.
*H04N 5/232* (2006.01)
*G06T 7/73* (2017.01)

(52) U.S. Cl.
CPC ........... *H04N 5/23218* (2018.08); *G06T 7/73* (2017.01); *H04N 5/23299* (2018.08)

(58) Field of Classification Search
None
See application file for complete search history.

(56) References Cited

U.S. PATENT DOCUMENTS

| 6,021,979 | A | * | 2/2000 | Bender | B64G 1/244 244/164 |
| 6,323,898 | B1 | * | 11/2001 | Koyanagi | G01S 3/7864 348/169 |
| 10,523,871 | B2 | * | 12/2019 | Hayashi | H04N 5/23218 |
| 2007/0257990 | A1 | * | 11/2007 | Hayashi | H04N 5/23203 348/211.99 |

FOREIGN PATENT DOCUMENTS

JP 2002171438 A 6/2002

* cited by examiner

*Primary Examiner* — Shadan E Haghani
(74) *Attorney, Agent, or Firm* — Canon U.S.A., Inc. IP Division

(57) ABSTRACT

A control apparatus includes a detection unit configured to detect an object from an image captured by an imaging apparatus, a control unit configured to control a drive unit in such a manner that an imaging direction of the imaging apparatus is changed following a movement of the object detected by the detection unit, and a determination unit configured to determine information about the movement of the object detected by the detection unit. The control unit controls drive frequency of the drive unit based on the information about the movement determined by the determination unit.

13 Claims, 10 Drawing Sheets

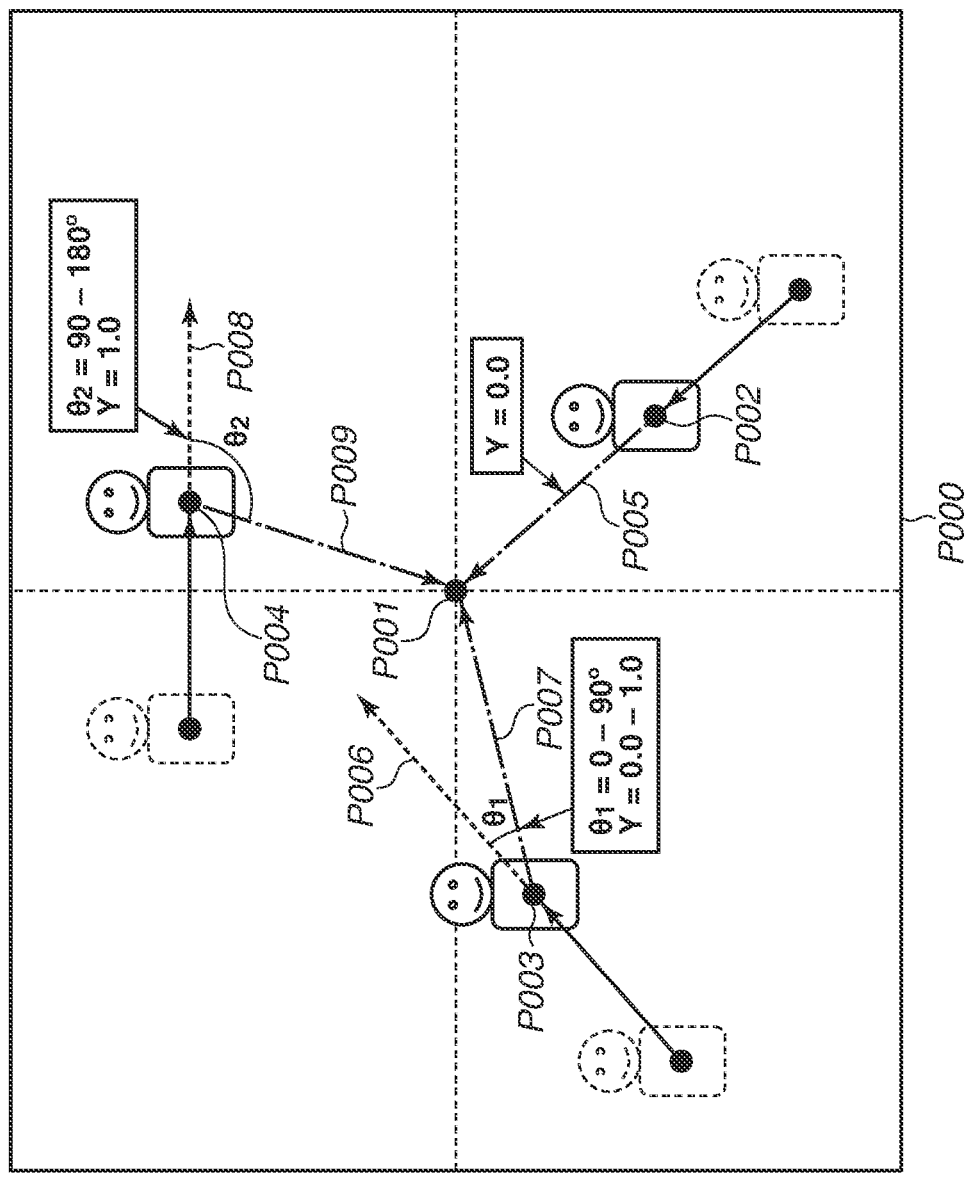

CONTROL APPARATUS, CONTROL METHOD, AND RECORDING MEDIUM

BACKGROUND

Field of the Disclosure

The present disclosure relates to a control apparatus, a control method, and a recording medium.

Description of the Related Art

With recent development in image analysis technology, a technique for automatically tracking a subject and capturing an image of the subject with a camera has been studied. Cameras equipped with an automatic tracking function, ranging from those for professional use designed to produce broadcast programs to those for household use designed to capture private video images, are beginning to attract attention.

Japanese Patent Application Laid-Open No. 2002-171438 discusses a technique ire vs which an area not requiring tracking, which is referred to as a dead zone, is provided in a viewing angle, and a subject is tracked only when the subject moves outside the dead zone.

However, in the conventional technique discussed in Japanese Patent Application Laid-Open No. 2002-171438, when a tracking target stays at a position that is within the dead zone and is shifted from the center of the viewing angle, image capturing may be continued with the tracking target at this position for a long time. It is desired to capture a tracking target as close to the center of the viewing angle as possible and to capture a video image in a composition in which the subject is easily visible.

SUMMARY

The present disclosure is directed to a mechanism capable of capturing a tracking target at the center of a viewing angle and capturing a video image in a composition in which the subject is easily visible.

According to an aspect of the present disclosure, a control apparatus includes a detection unit configured to detect an object from an image captured by an imaging apparatus, a control unit configured to control a drive unit in such a manner that an imaging direction of the imaging apparatus is changed following a movement of the object detected by the detection unit, and a determination unit configured to determine information about the movement of the object detected by the detection unit. The control unit controls drive frequency of the drive unit based on the information about the movement determined by the determination unit.

Further features of the present disclosure will become apparent from the following description of exemplary embodiments with reference to the attached drawings.

BRIEF DESCRIPTION OF THE DRAWINGS

FIG. 6 illustrates a method for calculating a moving direction evaluation value according to one or more aspects of the presently disclosure.

DESCRIPTION OF THE EMBODIMENTS

Exemplary embodiments of the present disclosure will be described in detail below with reference to the drawings.

Configurations described in the following exemplary embodiments are merely examples. The present disclosure is not limited to the illustrated configurations.

Figure 8:
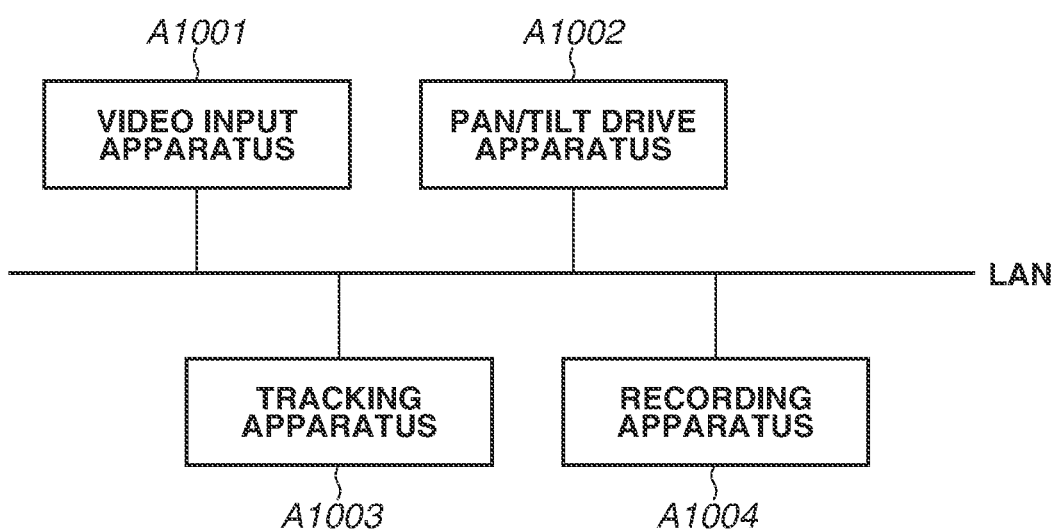
FIG. 8 is a block diagram illustrating a system configuration of an automatic imaging system according to one or more aspects of the presently disclosure.

A first exemplary embodiment will be described. FIG. 8 illustrates a system configuration of an automatic imaging system according to an exemplary embodiment of the present disclosure. The automatic imaging system includes a video input apparatus A1001 (imaging apparatus), a pan/tilt drive apparatus A1002 (drive apparatus or drive unit), a tracking apparatus A1003 (control apparatus), and a recording apparatus A1004. These apparatuses are mutually connected via a network (local area network (LAN)).

The video input apparatus A1001 is an imaging apparatus such as a network camera or an Internet Protocol (IP) streaming camera. The video input apparatus A1001 captures an image and sends the image as a video signal to the tracking apparatus A1003 via the network. Zoom magnification of an imaging optical system (lens) in the video input apparatus A1001 is controlled by the tracking apparatus A1003 via the network.

The pan/tilt drive apparatus A1002 is controlled to be driven by the tracking apparatus A1003 via the network, and is capable of changing an imaging direction of the video input apparatus A1001.

The pan/tilt drive apparatus A1002, which is capable of changing the imaging direction of the video input apparatus A1001, is also connected to the network.

The tracking apparatus A1003 is a control apparatus that controls the driving of the pan/tilt drive apparatus A1002 via the network. In addition, the tracking apparatus A1003 executes tracking processing of a subject (object) based on the image captured by the video input apparatus A1001. Furthermore, the tracking apparatus A1003 sends the image (image data) captured by the video input apparatus A1001 to the recording apparatus A1004 via the network.

The recording apparatus A1004 receives the image (image data) captured by the video input apparatus A1001 via the network, and stores the image (image data) in a storage medium such as a hard disk. Alternatively, the recording apparatus A1004 can receive the image data from the tracking apparatus A1003 via a video interface (not illustrated).

Figure 9:
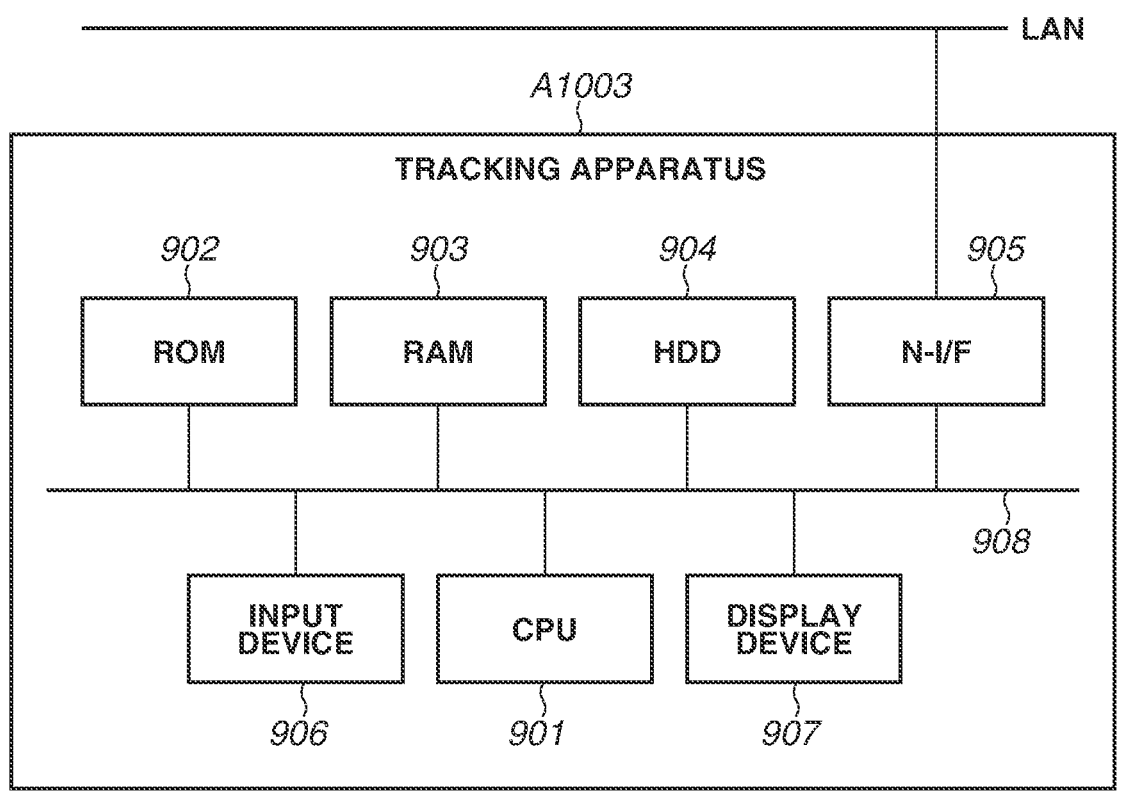
FIG. 9 is a block diagram illustrating a hardware configuration of a tracking apparatus according to one or more aspects of the presently disclosure.

FIG. 9 is a block diagram illustrating an example of a hardware configuration of the tracking apparatus A1003 according to an exemplary embodiment of the present disclosure. The tracking apparatus A1003 includes a central processing unit (CPU) 901, a read only memory (ROM) 902, a random access memory (RAM) 903, a hard disc drive (HDD) 904, a network interface (N-I/F) 905, an input device 906, and a display device 907. These components are mutually connected via a system bus 908. The N-I/F 905 is connected to the network (LAN).

The CPU 901 is a control device that integrally controls the tracking apparatus A1003. The ROM 902 is a storage device that stores various programs used by the CPU 901 to control the tracking apparatus A1003. The tracking apparatus A1003 may have a secondary storage device instead of the ROM 902. In the RAM 903, a program read from the ROM 902 by the CPU 901 is loaded. The RAM 903 is a memory that functions as a work area for the CPU 901. The RAM 903 also functions as a temporary storage area (memory) for temporarily storing data subject to various types of processing.

The HDD 904 is a storage device that stores various types of data such as the image data input from the video input apparatus A1001. The image data is target image data for object detection processing by the tracking apparatus A1003 according to the first exemplary embodiment. When the image data is stored in another storage device (for example, the ROM 902 or an external storage device), the tracking apparatus A1003 may not necessarily include the HDD 904.

The N-I/F 905 is a circuit used for communication with an external apparatus and the like via the network (LAN). The CPU 901 can acquire image data from the video input apparatus A1001, which is connected to the tracking apparatus A1003, via the network. The CPU 901 can control the video input apparatus A1001 and the pan/tilt drive apparatus A1002 via the network.

The input device 906 includes a keyboard and a pointing device. The keyboard is used to enter a numerical value, text, or the like. The pointing device is used to designate a specific position in a display area of the display device 907, and is configured by a mouse, a touchscreen, or the like. A user can operate the input device 906 to designate (select) an object as a tracking target from the image displayed on the display device 907.

The functions of the tracking apparatus A1003 to be described below are implemented by the CPU 901 executing processing based on the programs stored in the ROM 902, the HDD 904, or the like. The processing of the flowchart in FIG. 2 to be described below is also implemented by the CPU 901 executing processing based on the programs stored in the ROM 902, the HDD 904, or the like.

As described above, the tracking apparatus A1003 has similar hardware components to those mounted on a personal computer (PC) or the like. Thus, the tracking apparatus A1003 according to the present exemplary embodiment is configured by an information processing apparatus such as a PC, a tablet apparatus, or a server apparatus. In addition, various functions of the tracking apparatus A1003 according to the present exemplary embodiment, which will be described below with reference to FIG. 1, can be implemented as applications running on an information processing apparatus such as a PC.

Figure 1:
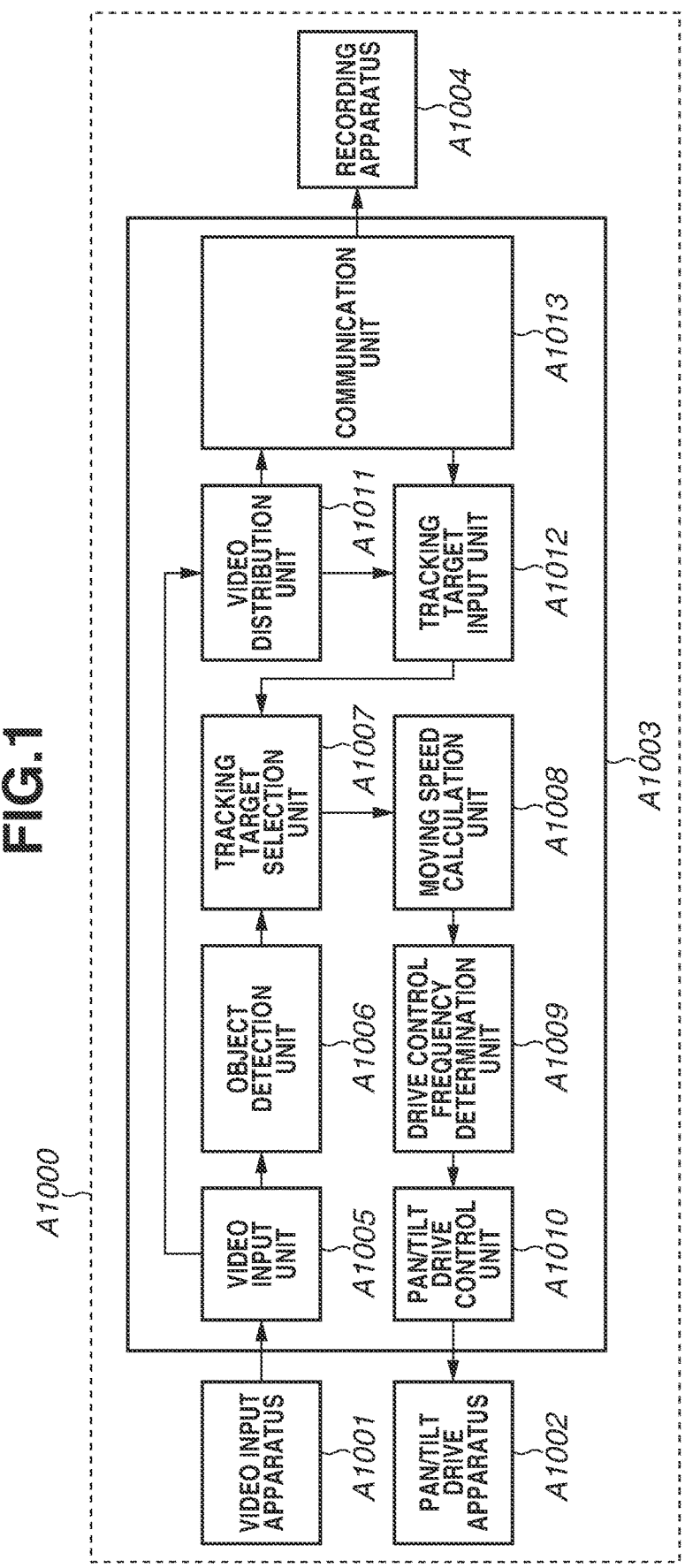
FIG. 1 is a block diagram illustrating an automatic imaging system according to one or more aspects of the present disclosure.

FIG. 1 is a block diagram illustrating a functional configuration of an automatic imaging system including the tracking apparatus A1003 (control apparatus) according to the present exemplary embodiment. An automatic imaging system A1000 tracks a specific object designated by the user and automatically captures an image of the object. The automatic imaging system A1000 performs part/tilt control to track and position the designated tracking target at the center of the viewing angle, and records video data. When a moving speed of the tracking target is slow, the tracking target is less likely to move outside the viewing angle. Accordingly, the frequency of the pan/tilt control is decreased to reduce shake in a video image. The automatic imaging system A1000 includes the video input apparatus A1001, the pan/tilt drive apparatus A1002, the tracking apparatus A1003, and the recording apparatus A1004. The tracking apparatus A1003 and the recording apparatus A1004 are connected to each other via a network (LAN) or a video interface.

The video input apparatus A1001 captures an image of a surrounding area and generates a video signal. The video input apparatus A1001 is configured by an imaging apparatus such as a camera. The video input apparatus A1001 outputs captured video data to the tracking apparatus A1003.

The pan/tilt drive apparatus A1002 is mechanically connected to the video input apparatus A1001 by a member (not illustrated), and includes a motor and a gear. When receiving a series of pan/tilt operation commands from the tracking apparatus A1003, the pan/tilt drive apparatus A1002 controls the motor to perform pan/tilt operation. In this way, the pan/tilt drive apparatus A1002 changes an imaging direction of the video input apparatus A1001.

The recording apparatus A1004 executes processing for saving video data, which is input from the tracking apparatus A1003, in a storage device such as a HDD. The recording apparatus A1004 also displays the input video data on a display unit (not illustrated) and receives designation of a tracking target by the user. Then, the recording apparatus A1004 sends coordinate data of the tracking target designated by the user to the tracking apparatus A1003. The method for designating a tracking target is not limited thereto. For example, by using the input device 906 (a tracking target input unit A1012) in the tracking apparatus A1003, the user can designate an object as a tracking target from the image displayed on the display device 907. Alternatively, among objects contained in the input video data, an object having a specific characteristic amount may automatically be designated as a tracking target.

The tracking apparatus A1003 (control apparatus) analyzes the video data input from the video input apparatus A1001 (imaging apparatus), and generates a pan/tilt operation command so as to position the tracking target at the center of the viewing angle. The tracking apparatus A1003 generates the pan/tilt operation command at a high frequency when the moving speed of the tracking target is fast. The tracking apparatus A1003 generates the pan/tilt operation command at a low frequency when the moving speed of the tracking target is slow. The tracking apparatus A1003 includes a video input unit A1005, an object detection unit A1006, a tracking target selection unit A1007, a moving speed calculation unit A1008, a drive control frequency determination unit A1009, a pan/tilt drive control unit A1010, a video distribution unit A1011, the tracking target input unit A1012, and a communication unit A1013. The tracking apparatus A1003 (control apparatus) outputs the generated pan/tilt operation command to the pan/tilt drive apparatus A1002 (drive apparatus or drive unit), and outputs the video data to the recording apparatus A1004.

The video input unit A1005 inputs the video data captured by the video input apparatus A1001 and outputs the video data to the object detection unit A1006 and the video distribution unit A1011.

The object detection unit A1006 (detection unit) uses the video data input from the video input unit A1005 to execute processing for detecting an object in the image. As an object detection method, for example, a template matching method or deep learning is used. These detection methods are known techniques and thus the detailed description thereof will be omitted. The object detection unit A1006 assigns a unique identification (ID) to each of all detected objects. When any of the detected objects is determined as identical to that detected in the past based on past object detection results, the object detection unit A1006 assigns, to the object determined as identical, the same ID as that of the object detected in the past. The object detection unit A1006 outputs the coordinate data and ID information of each of the detected objects to the tracking target selection unit A1007. The coordinate data is output as absolute coordinates in a spherical coordinate system.

The coordinate data of the tracking target is input from the recording apparatus A1004 to the tracking target input unit A1012 via the communication unit A1013. Alternatively, the coordinate data can be input by the user using the input device 906 (the tracking target input unit A1012) in the tracking apparatus A1003 to designate an object as a tracking target from the image displayed on the display device 907.

When receiving the coordinate data of the tracking target from the tracking target input unit A1012, the tracking target selection unit A1007 compares the coordinate data of the objects) input from the object detection unit A1006 with the coordinate data of the tracking target. Then, the tracking target selection unit A1007 sets the object, which has the closest coordinate data to that of the tracking target, as the tracking target. When the tracking target selection unit A1007 has not received the coordinate data of the tracking target from the tracking target input unit A1012 and thus has not set the tracking target, the tracking processing is not executed. After setting the tracking target, the tracking target selection unit A1007 selects the coordinate data and ID information of the tracking target from among the coordinate data and ID information of the objects input from the object detection unit A1006. Then, the tracking target selection unit A1007 outputs the selected coordinate data and ID information to the moving speed calculation unit A1008.

The moving speed calculation unit A1008 holds the coordinate data and ID information of the tracking target, which are input from the tracking target selection unit A1007, for the past ten frames, for example. Then, the moving speed calculation unit A1008 calculates the moving speed of the object associated with the ID information. If ID information different from the ID information of the previous time is designated, the moving speed calculation unit A1008 determines that the object does not move. In addition, the moving speed calculation unit A1008 calculates an evaluation value based on the moving speed so that the drive control frequency is controlled to be low when the moving speed is slow and to be high when the moving speed is fast.

Figure 3:
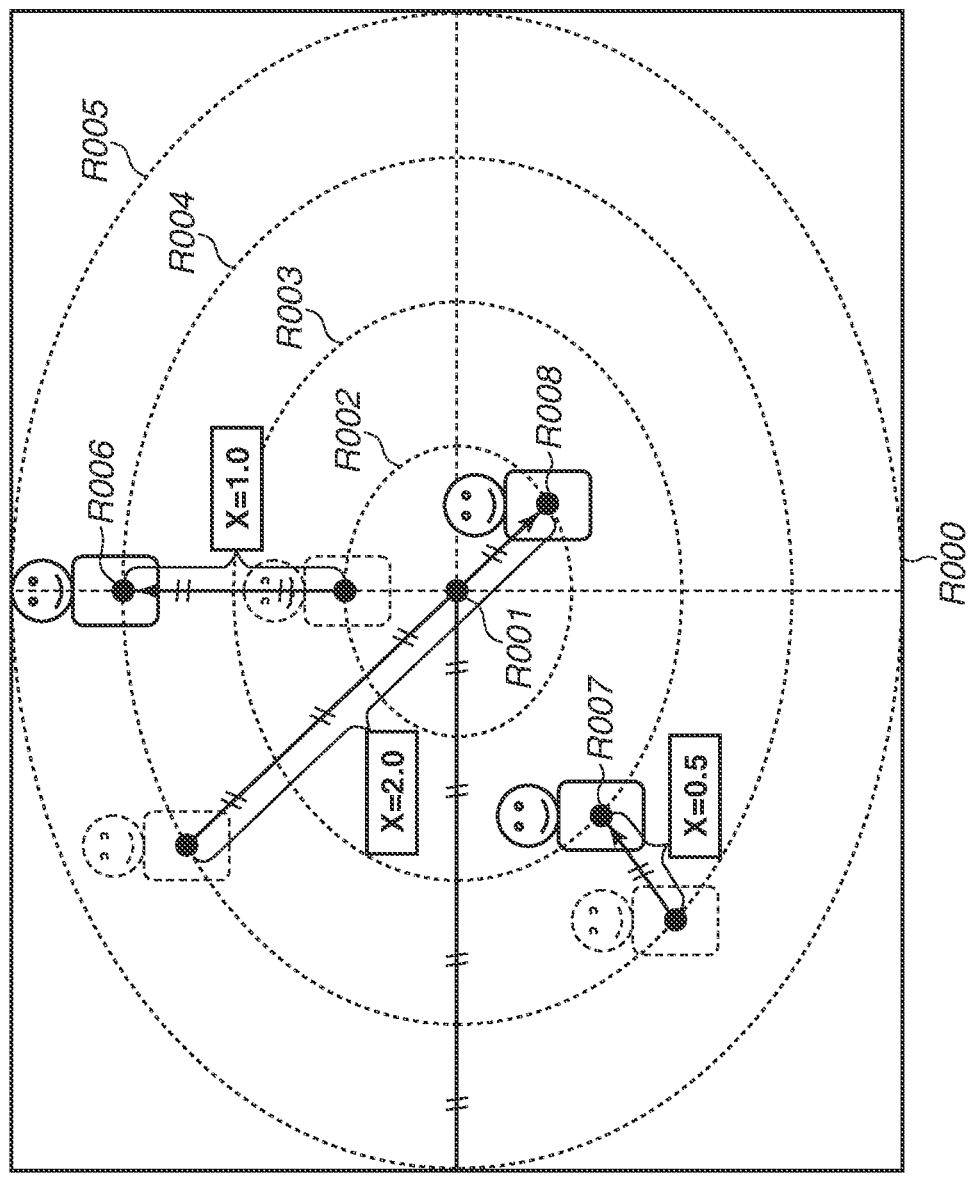
FIG. 3 illustrates a method for calculating a moving speed evaluation value according to one or more aspects of the presently disclosure.

An example of a method for calculating a moving speed evaluation value (hereinafter referred to as the evaluation value X) will be described with reference to FIG. 3. FIG. 3 illustrates a video image R000 of the viewing angle (full viewing angle) captured by the automatic imaging system A1000. FIG. 3 also illustrates a center point R001 of the viewing angle, and an ellipse R002 that connects points where the distance from the center point R001 is ⅛ of the width or height of the viewing angle (full viewing angle). Similarly, FIG. 3 illustrates an ellipse R003 that connects points where the distance from the center point R001 is ⅖ of the width or height of the viewing angle, an ellipse R004 that connects points where the distance from the center point R001 is ⅜ of the width or height of the viewing angle, and an ellipse R005 that connects points where the distance from the center point R001 is ⅘ of the width or height of the viewing angle. As indicated by a tracking target R006, when the target moves through the distance corresponding to ⅖ of the width or height of the viewing angle (full viewing angle) in one second, the evaluation value X is defined to be 1.0. The evaluation value X=1.0 corresponds to executing the drive control at a frequency of once per second. The evaluation value X is proportional to the moving speed of the tracking target, and the drive control frequency is proportional to the evaluation value X. As indicated by a tracking target R007, when the target moves through the distance corresponding to ⅛ of the width or height of the viewing angle in one second, the evaluation value X is 0.5. In such a case, the drive control is executed once every two seconds. As indicated by a tracking target R008, when the target moves through the distance corresponding to ⅘ of the width or height of the viewing angle in one second, the evaluation value X is 2.0. In such a case, the drive control is executed once every 0.5 seconds. In order to execute the drive control at a low frequency even when the tracking target does not move or the moving speed of the tracking target is extremely slow, a minimum value of the evaluation value X is set to 0.1, and the drive control is executed at least once every 10 seconds. The moving speed calculation unit A1008 outputs the ID information and coordinate data of the tracking target and the evaluation value X to the drive control frequency determination unit A1009.

The drive control frequency determination unit A1009 (determination unit) receives the ID information and coordinate data of the tracking target and the evaluation value X from the moving speed calculation unit A1008. Then, the drive control frequency determination unit A1009 holds an integrated value of the received evaluation value X. When the held integrated value of the evaluation value X is equal to or larger than a threshold, the drive control frequency determination unit A1009 outputs the coordinate data of the tracking target as target coordinates to the pan/tilt drive control unit A1010. Then, the drive control frequency determination unit A1009 clears the integrated value of the evaluation value X. Here, when the moving speed of the tracking target s fast, the integrated value of the evaluation value X reaches the threshold early because the faster the moving speed is, the larger the evaluation value X is. As a result, the pan/tilt drive control is executed at short intervals (the drive frequency is high). On the other hand, when the moving speed is slow, the integrated value reaches the threshold later because the slower the moving speed is, the smaller the evaluation value X is. As a result, the pan/tilt drive control is executed at long intervals (the drive frequency is low). The pan/tilt drive frequency can be controlled with this mechanism. As described above, in the present exemplary embodiment, the pan/tilt drive control unit A1010 (control unit) in the tracking apparatus A1003 (control apparatus) controls the drive frequency of the pan/tilt drive apparatus A1002 (drive apparatus or drive unit) based on the movement information (evaluation value X) of the object (tracking target).

When receiving the tracking target coordinates from the drive control frequency determination unit A1009, the pan/tilt drive control unit A1010 (control unit) outputs a pan/tilt control command to the pan/tilt drive apparatus A1002 so as to move the center of the viewing angle to the target coordinates. More specifically, the pan/tilt drive control unit A1010 (control unit) controls the pan/tilt drive apparatus A1002 (drive apparatus or drive unit) in such a manner that the imaging direction of the video input apparatus A1001 (imaging apparatus) is changed following the movement of the object detected by the object detection unit A1006 (detection unit).

When receiving the video data from the video input unit A1005, the video distribution unit A1011 outputs the video data to the recording apparatus A1004 via the communication unit A1013.

When receiving the coordinate data of the tracking target from the communication unit A1013, the tracking target input unit A1012 outputs the coordinate data of the tracking target to the tracking target selection unit A1007.

The communication unit A1013 outputs the video data, which is input from the video distribution unit A1011, to the recording apparatus A1004. The target coordinates of the tracking target input by a user operation (not illustrated) are input to the tracking target input unit A1012.

Figure 2:
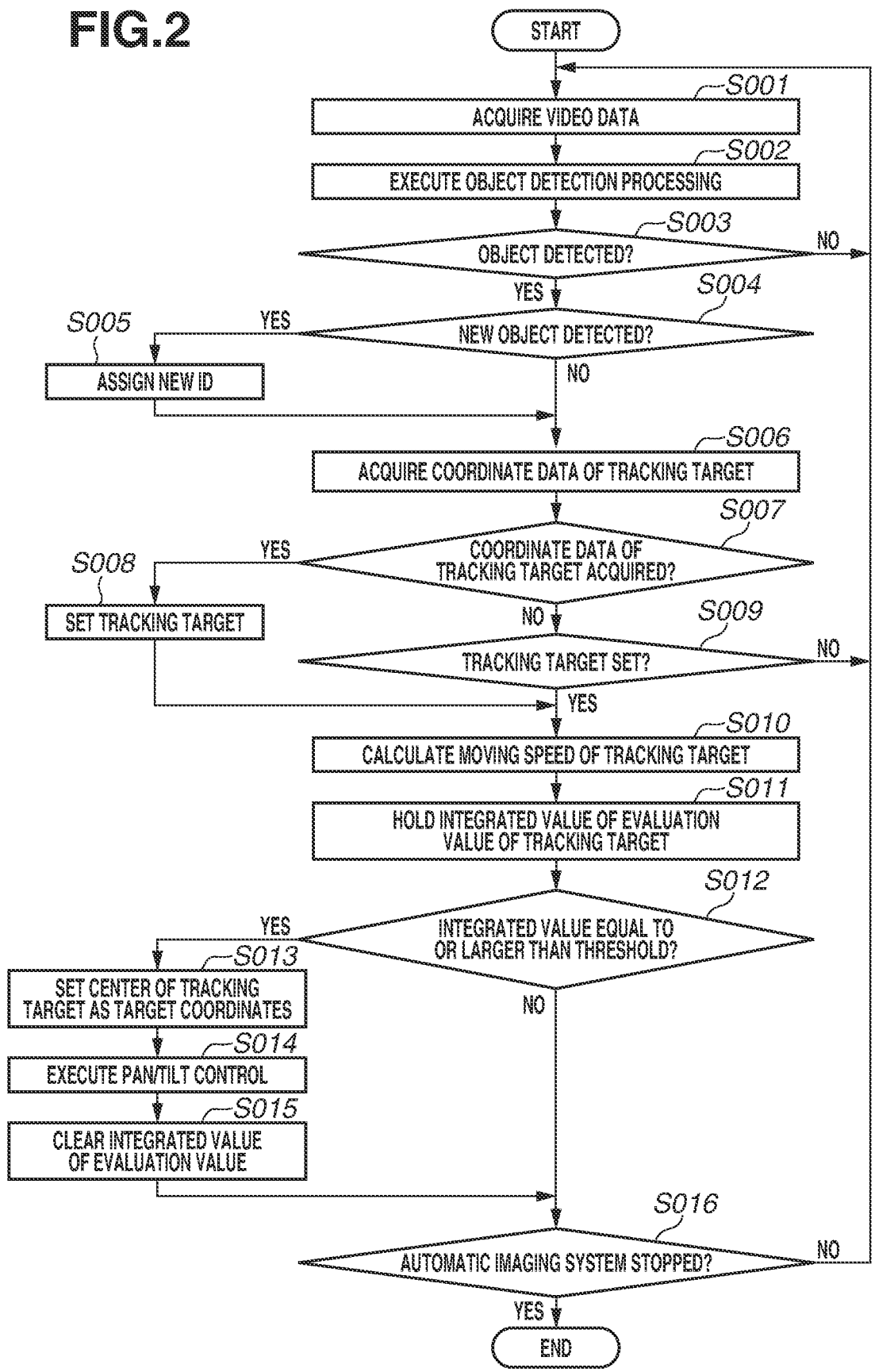
FIG. 2 is a flowchart illustrating a processing procedure performed by the automatic imaging system according to one or more aspects of the presently disclosure.

A procedure of the tracking processing performed by the automatic imaging system A1000 will be described with reference to the flowchart in FIG. 2.

The automatic imaging system A1000 is activated by a user operation on the recording apparatus A1004. When automatic imaging processing is initiated, first, in step S001, the video input unit A1005 acquires video data from the video input apparatus A1001. Then, the processing proceeds to step S002. Alternatively, the automatic imaging system A1000 may be activated by a user operation on the tracking apparatus A1003 or the video input apparatus A1001.

In step S002, the object detection unit A1006 analyzes the video data input from the video input unit A1005, and executes processing for detecting an object in the video data. Then, the processing proceeds to step S003.

In step S003, the object detection unit A1006 determines whether an object is detected. When an object is detected (YES in step S003), the processing proceeds to step S004. When an object is not detected (NO in step S003), the processing returns to step S001.

In step S004, the object detection unit A1006 determines whether a new object, which has not been detected in the past, is detected. When a new object is detected (YES in step S004), the processing proceeds to step S005. When a new object is not detected (NO in step S004), the processing proceeds to step S006.

In step S005, the object detection unit A1006 assigns a new ID to the new detected object. Then, the processing proceeds to step S006.

In step S006, the tracking target selection unit A1007 acquires the coordinate data of a tracking target from the tracking target input unit A1012. Then, the processing proceeds to step S007.

In step S007, the tracking target selection unit A1007 determines whether the coordinate data of the tracking target is acquired from the tracking target input unit A1012. When the coordinate data of the tracking target is acquired (YES in step S007), the processing proceeds to step S008. When the coordinate data of the tracking target is not acquired (NO in step S007), the processing proceeds to step S009.

In step S008, the tracking target selection unit A1007 determines the object to be tracked, based on the coordinate data and ID information of the detected object(s) and the coordinate data of the tracking target acquired from the tracking target input unit A1012, and sets the determined object as the tracking target. Then, the processing proceeds to step S010.

In step S009, the tracking target selection unit A1007 determines whether the tracking target is set. When the tracking target is set (YES in step S009), the processing proceeds to step S010. When the tracking target is not set (NO in step S009), the processing returns to step S001.

In step S010, the moving speed calculation unit A1008 calculates the moving speed of the tracking target based on the coordinate data and ID information of the tracking target input from the tracking target selection unit A1007. The moving speed calculation unit A1008 farther calculates the evaluation value X which is used to control the drive control frequency, based on the moving speed. Then the processing proceeds to step S011.

In step S011, the drive control frequency determination unit A1009 holds an integrated value of the evaluation value X of the tracking target input from the moving speed calculation unit A1008. Then, the processing proceeds to step S012.

In step S012, the drive control frequency determination unit A1009 determines whether the integrated value of the evaluation value X is equal to or larger than the threshold. When the integrated value is equal to or larger than the threshold (YES in step S012), the processing proceeds to step S013. When the integrated value is smaller than the threshold (NO in step S012), the processing proceeds to step S016.

In step S013, the drive control frequency determination unit A1009 sets the center of the tracking target as the tracking target coordinates. Then, the processing proceeds to step S014.

In step S014, the pan/tilt drive control unit A1010 outputs a pan/tilt control command to the pan/tilt drive apparatus A1002 so as to execute pan/tilt driving based on the target coordinates input from the drive control frequency determination unit A1009. Then, the processing proceeds to step S015.

In step S015, the drive control frequency determination unit A1009 clears the integrated value of the evaluation value X, and the processing proceeds to step S016.

In step S016, it is determined whether the user operates an unillustrated ON/OFF switch, which is provided to the recording apparatus A1004 or the like, to stop the automatic imaging system A1000. When the switch is not operated (NO in step S016), the processing returns to step S001. When the switch is operated (YES in step S016), the operation of the automatic imaging system A1000 is terminated.

As described above, in the present exemplary embodiment, when the moving speed of the tracking target is slow, the pan/tilt driving is performed at a low frequency. As a result, the tracking target can be moved to the center of the viewing angle while shake in a video image is reduced. In addition, when the moving speed of the tracking target is fast, the pan/tilt driving is performed at a high frequency. As a result, the possibility that the tracking target may move outside the viewing angle can be reduced.

A configuration example of an automatic imaging system according to a second exemplary embodiment of the present invention will be described. While in the first exemplary embodiment, the pan/tilt drive frequency is controlled based on the moving speed of the tracking target, in the second exemplary embodiment, pan/tilt/zoom drive frequency is controlled based on a moving direction and a center distance in addition to the moving speed.

In addition, while in the first exemplary embodiment, the pan/tilt drive frequency is controlled, in the second exemplary embodiment, zoom drive frequency is controlled in addition to the pan/tilt drive frequency. Furthermore, while in the first exemplary embodiment, a single object is set as the tracking target, in the second exemplary embodiment, not only a single object but also a plurality of objects can be set as the tracking targets.

Figure 4:
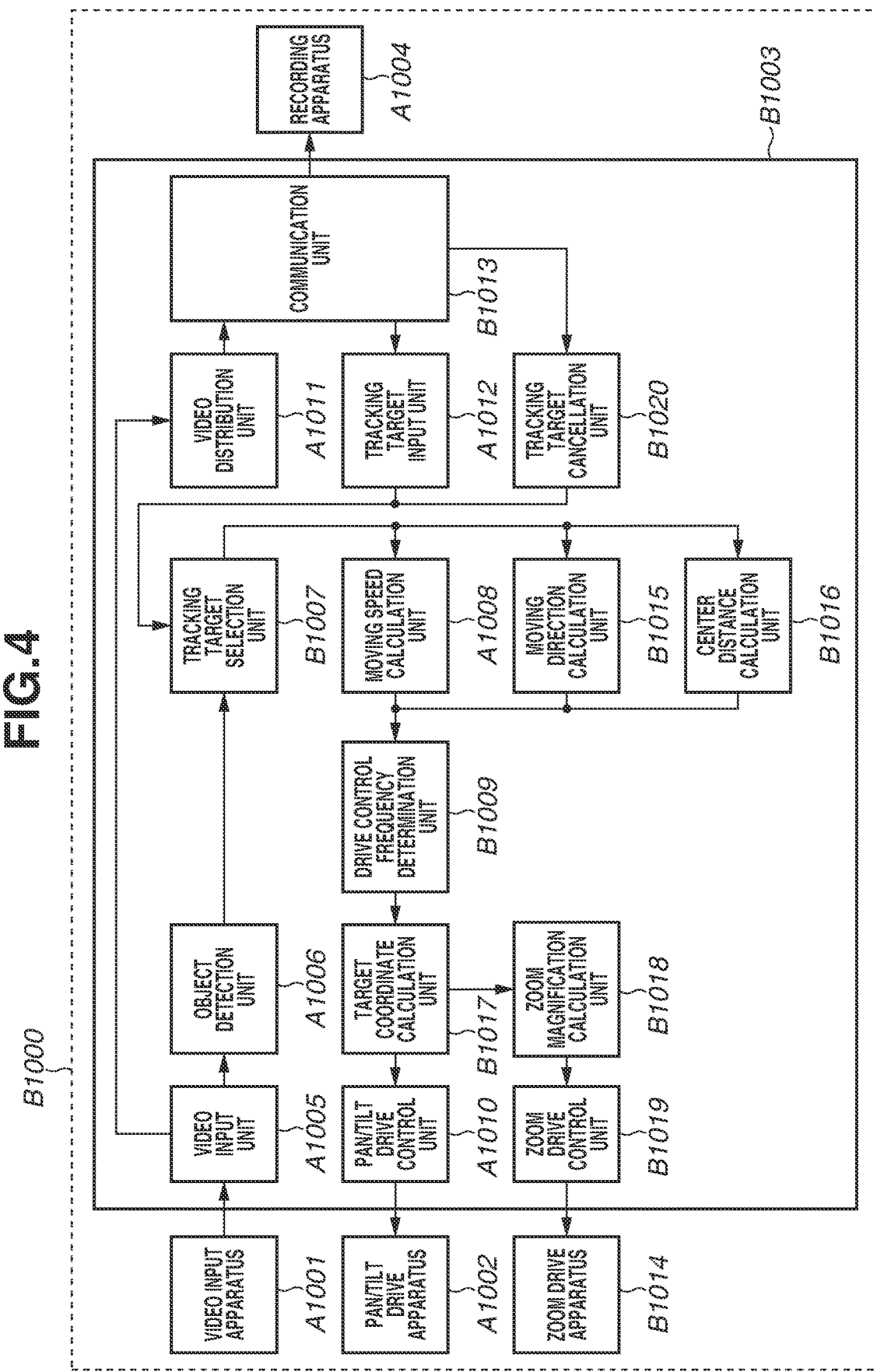
FIG. 4 is a block diagram illustrating an automatic imaging system according to one or more aspects of the presently disclosure.

FIG. 4 is a block diagram illustrating a functional configuration of an automatic imaging system including a tracking apparatus according to the present exemplary embodiment. Components common to both the first exemplary embodiment and the second exemplary embodiment are denoted by the same reference numerals, and the description thereof will be omitted.

An automatic imaging system B1000 tracks a plurality of objects to automatically capture an image of the objects. The automatic imaging system B1000 performs pan/tilt/zoom control to track and position all designated tracking targets within the viewing angle, and stores video data. When the moving speeds of the tracking targets are slow, the tracking targets are less likely to move outside the viewing angle. Accordingly, the pan/tilt/zoom control frequency is decreased to reduce shake in a video image. When a single tracking target is tracked to be positioned at the center of the viewing angle as described in the first exemplary embodiment, it is assumed that the tracking target is basically near the center of the viewing angle and moves toward the outside of the viewing angle. However, in the present exemplary embodiment, when a plurality of tracking targets is tracked, different tracking targets may be in different positions and move in different directions. Accordingly, when the tracking targets move toward the center of the viewing angle or when the tracking targets are near the center of the viewing angle, it is determined that the tracking targets are less likely to move outside the viewing angle, and the pan/tilt/zoom control frequency is adjusted to be low. In the present exemplary embodiment, when at least one of the tracking targets is likely to move outside the viewing angle, the pan/tilt/zoom control frequency is adjusted to be high. The automatic imaging system B1000 includes the video input apparatus A1001 (imaging apparatus), the pan/tilt drive apparatus A1002 (drive apparatus or drive unit), a tracking apparatus B1003 (control apparatus), the recording apparatus A1004, and a zoom drive apparatus B1014. The tracking apparatus B1003 and the recording apparatus A1004 are connected to each other via a video interface or the like.

The tracking apparatus B1003 analyzes the video data input from the video input apparatus A1001, and generates a pan/tilt/zoom operation command so as to position a plurality of preset tracking targets within the viewing angle. For each of the tracking targets, the tracking apparatus B1003 determines the moving speed, the moving direction, and the distance from the center point of the viewing angle. When the tracking apparatus B1003 determines based on these items of information that any of the tracking targets is likely to move outside the viewing angle, the tracking apparatus B1003 generates the pan/tilt/zoom operation command at a high frequency. When the tracking apparatus B1003 determines that none of the tracking targets are likely to move outside the viewing angle, the tracking apparatus B1003 generates the pan/tilt/zoom operation command at a low frequency. The tracking apparatus B1003 (control apparatus) includes the video input unit A1005, the object detection unit A1006 (detection unit), the moving speed calculation unit A1008, the pan/tilt drive control unit A1010 (control unit), the video distribution unit A1011, and the tracking target input unit A1012. The tracking apparatus B1003 further includes a tracking target selection unit B1007, a moving direction calculation unit B1015, a center distance calculation unit B1016, a target coordinate calculation unit B1017, a zoom magnification calculation unit B1018, a zoom drive control unit B1019, a tracking target cancellation unit B1020, and a communication unit B1013. The tracking apparatus B1003 sends the generated pan/tilt operation command to the pan/tilt drive apparatus A1002. In addition, the tracking apparatus B1003 sends the generated zoom operation command to the zoom drive apparatus B1014. Furthermore, the tracking apparatus B1003 outputs the video data input from the video input apparatus A1001 (imaging apparatus) to the recording apparatus A1004.

When receiving the coordinate data of the tracking target from the tracking target input unit A1012, the tracking target selection unit B1007 compares the coordinate data of the object(s) input from the object detection unit A1006 with the coordinate data of the tracking target. Then, the tracking target selection unit B1007 sets the object, which has the closest coordinate data to that of the tracking target, as the tracking target. In addition, when receiving the coordinate data of a tracking cancellation target from the tracking target cancellation unit B1020, the tracking target selection unit B1007 compares the coordinate data of the object(s) input from the object detection unit A1006 with the coordinate data of the tracking cancellation target. Then, the tracking target selection unit B1007 deletes the object, which has the closest coordinate data to that of the tracking cancellation target, from the tracking target setting. When one or more tracking targets are set, the tracking processing is executed. After setting the tracking target(s), the tracking target selection unit B1007 selects the coordinate data and ID information of the tracking target(s) and outputs the selected coordinate data and ID information to the moving speed calculation unit A1008, the moving direction calculation unit B1015, and the center distance calculation unit B1016.

The moving direction calculation unit B1015 holds the coordinate data and ID information of each of the tracking targets, which are input from the tracking target selection unit B1007, for the past ten frames. Then, the moving direction calculation unit B1015 calculates the moving direction of the object associated with the ID information. If ID information different from the ID information of the previous time is designated, the moving direction calculation unit B1015 determines that the object does not move in any direction. In addition, the moving direction calculation unit B1015 calculates an evaluation value based on the moving direction so that the drive control frequency is controlled to be low when the moving direction is the direction toward the center of the viewing angle, and to be high when the moving direction is the direction toward the outside of the viewing angle.

An example of a method for calculating a moving direction evaluation value (hereinafter referred to as the evaluation value Y) will be described with reference to FIG. 6. FIG. 6 illustrates a video image P000 of the viewing angle (full viewing angle) captured by the automatic imaging system B1000, and also illustrates a center point P001 of the viewing angle. As indicated by a tracking target P002, when a moving direction P005 matches the direction toward the center of the viewing angle, the evaluation value Y is 0.0. As indicated by a tracking target P003, when an angle defined by a moving direction P006 and a direction toward the center of the viewing angle P007 is 0 to 90°, the evaluation value Y is determined by the following equation (1) based on an angle θ.

$$Y = \frac{\theta}{90} \times 1.0 \qquad (1)$$

As indicated by a tracking target P004, when an angle defined by a moving direction P008 and a direction toward the center of the viewing angle P009 is 90 to 180°, the evaluation value Y is 1.0. When the moving direction of a tracking target is not present (the tracking target does not move), the drive control is executed at a low frequency and the evaluation value Y is set to 0.5. The moving direction calculation unit B1015 outputs the ID information and evaluation values Y of all the tracking targets to a drive control frequency determination unit B1009.

Based on the coordinate data and ID information of all the tracking targets input from the tracking target selection unit B1007, the center distance calculation unit B1016 calculates the distance between the current center point of the viewing angle and the coordinate data of each of the tracking targets. In addition, the center distance calculation unit B1016 calculates an evaluation value based on the distance from the center point so that the drive control frequency is controlled to be low when the tracking targets are near the center of the viewing angle, and to be high when the tracking targets are away from the center of the viewing angle.

Figure 7:
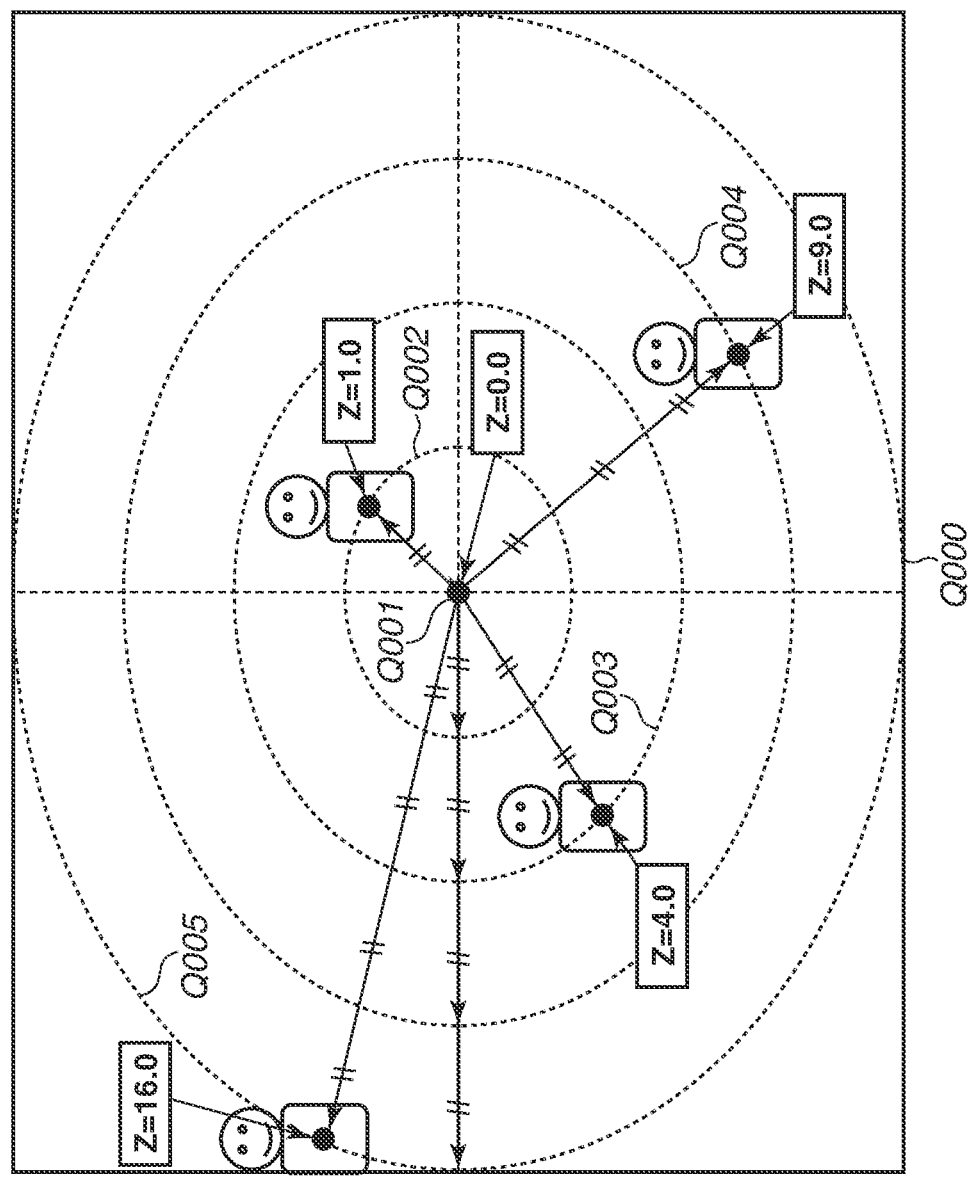
FIG. 7 illustrates a method for calculating a center distance evaluation value according to one or more aspects of the presently disclosure.

An example of a method for calculating a center distance evaluation value (hereinafter referred to as the evaluation value Z) will be described with reference to FIG. 7. FIG. 7 illustrates a video image Q000 of the viewing angle (full viewing angle) captured by the automatic imaging system B1000, and also illustrates a center point Q001 of the viewing angle. When the coordinate data of the tracking target is at the center point Q001, the evaluation value Z is 0.0. FIG. 7 further illustrates an ellipse Q002 that defines a center distance where the evaluation value Z is 1.0. When the coordinate data of the tracking target is on the ellipse Q002, the evaluation value Z is 1.0. When the center distance defined by the ellipse Q002 is 1 and a distance between the tracking target and the center point Q001 is A, the evaluation value Z is obtained by the following equation (2).

$$Z = A^2 \qquad (2)$$

For example, when the tracking target is located on an ellipse Q003, which defines a center distance that is twice the center distance defined by the ellipse Q002, the evaluation value Z is 4.0. When the tracking target is located on an ellipse Q004, which defines a center distance that is three times the center distance defined by the ellipse Q002, the evaluation value Z is 9.0. When the tracking target is located on an ellipse Q005, which defines a center distance that is four times the center distance defined by the ellipse Q002, the evaluation value Z is 16.0. The center distance calculation unit B1016 outputs the ID information and evaluation values Z of all the tracking targets to the drive control frequency determination unit B1009.

The drive control frequency determination unit B1009 receives the ID information, coordinate data, and evaluation value X of each of the tracking targets from the moving speed calculation unit A1008. The drive control frequency determination unit B1009 also receives the ID information and evaluation value Y of each of the tracking targets from the moving direction calculation unit B1015. The drive control frequency determination unit B1009 further receives the ID information and evaluation value Z of each of the tracking targets from the center distance calculation unit B1016. The drive control frequency determination unit B1009 acquires a total evaluation value for each of the tracking targets by multiplying the evaluation value X, which is the moving speed evaluation value, the evaluation value Y, which is the moving direction evaluation value, and the evaluation value Z, which is the center distance evaluation value. Then, the drive control frequency determination unit B1009 holds an integrated value of the total evaluation value. The drive control frequency determination unit B1009 holds the integrated value of the total evaluation value for each of the tracking targets. When the integrated value of the total evaluation value of any of the tracking targets is equal to or larger than a threshold, the drive control frequency determination unit B1009 outputs the coordinate data of all the tracking targets to the target coordinate calculation unit B1017. Then, the drive control frequency determination unit B1009 clears the integrated values of the total evaluation values of all the tracking targets. The method for acquiring the total evaluation value is not limited to the multiplication of the evaluation values X, Y, and Z, and may be addition thereof.

Here, when the moving speed of the tracking target is fast, the integrated value of the total evaluation value reaches the threshold early because the faster the moving speed is, the larger the evaluation value X is. As a result, the pan/tilt/zoom drive control is executed at short intervals (the drive frequency is high). In addition, when the moving direction is the direction toward the outside of the viewing angle, the integrated value of the total evaluation value reaches the threshold early because the more the tracking object moves toward the outside of the viewing angle, the larger the evaluation value Y is. As a result, the pan/tilt/zoom drive control is executed at short intervals (the drive frequency is high). Similarly, when the current position is away from the center of the viewing angle, the integrated value of the total evaluation value reaches the threshold early because the further the current position is away from the center, the larger the evaluation value Z is. As a result, the pan/tilt/zoom drive control is executed at short intervals (the drive frequency is high). The pan/tilt/zoom drive frequency can be controlled with this mechanism. As described above, in the present exemplary embodiment, the pan/tilt drive control unit A1010 in the tracking apparatus B1003 controls the drive frequency of the pan/tilt drive apparatus A1002 based on the movement information (total evaluation value, evaluation value X, evaluation value Y, and evaluation value Z) of each of a plurality of objects (tracking targets).

When receiving the coordinate data of all the tracking targets from the drive control frequency determination unit B1009, the target coordinate calculation unit B1017 sets the center positions of all the tracking targets as the tracking target coordinates, and outputs the tracking target coordinates to the pan/tilt drive control unit A1010. The target coordinate calculation unit B1017 also outputs the coordinate data of all the tracking targets and the tracking target coordinates to the zoom magnification calculation unit B1018.

When receiving the coordinate data of all the tracking targets and the tracking target coordinates from the target coordinate calculation unit B1017, the zoom magnification calculation unit B1018 predicts the coordinates of all the tracking targets that will be located after the center of the viewing angle (full viewing angle) is moved to the target coordinates by the pan/tilt driving. Then, the zoom magnification calculation unit B1018 determines whether each of the tracking targets can be positioned within a predetermined target imaging area in the viewing angle. When any of the tracking targets cannot be positioned within the target imaging area, the zoom magnification calculation unit B1018 calculates a zoom magnification so that each of the tracking targets can be positioned within the target imaging area. The zoom magnification calculation unit B1018 outputs the calculated zoom magnification to the zoom drive control unit B1019. Here, the target imaging area is set to be slightly smaller than the imaging area defined by the viewing angle (full viewing angle). Thus, when the tracking target is located at an edge of the screen, zoom-out control is executed to position the tracking target within the viewing angle.

When receiving the zoom magnification from the zoom magnification calculation unit B1018, the zoom drive control unit B1019 outputs a zoom control command to the zoom drive apparatus B1014 so as to achieve the zoom magnification.

When receiving the coordinate data of the tracking cancellation target from the communication unit V1013, the tracking target cancellation unit B1020 outputs the coordinate data of the tracking cancellation target to the tracking target selection unit B1007.

The communication unit B1013 outputs the video data input from the video distribution unit A1011 to the recording apparatus A1004. The target coordinates of the tracking target input by a user operation (not illustrated) are input to the tracking target input unit A1012. In addition, the target coordinates of the tracking cancellation target input by a user operation (not illustrated) are input to the tracking target cancellation unit B1020.

The zoom drive apparatus B1014 is capable of changing the zoom magnification of the video input apparatus A1001, and includes a motor and a gear. When receiving a series of zoom operation commands from the tracking apparatus B1003, the zoom drive apparatus B1014 controls the motor to perform the zoom operation.

The rest of the configuration of the automatic imaging system B1000 according to the second exemplary embodiment is the same as that of the automatic imaging system A1000 according to the first exemplary embodiment.

Figures 5, 5A:
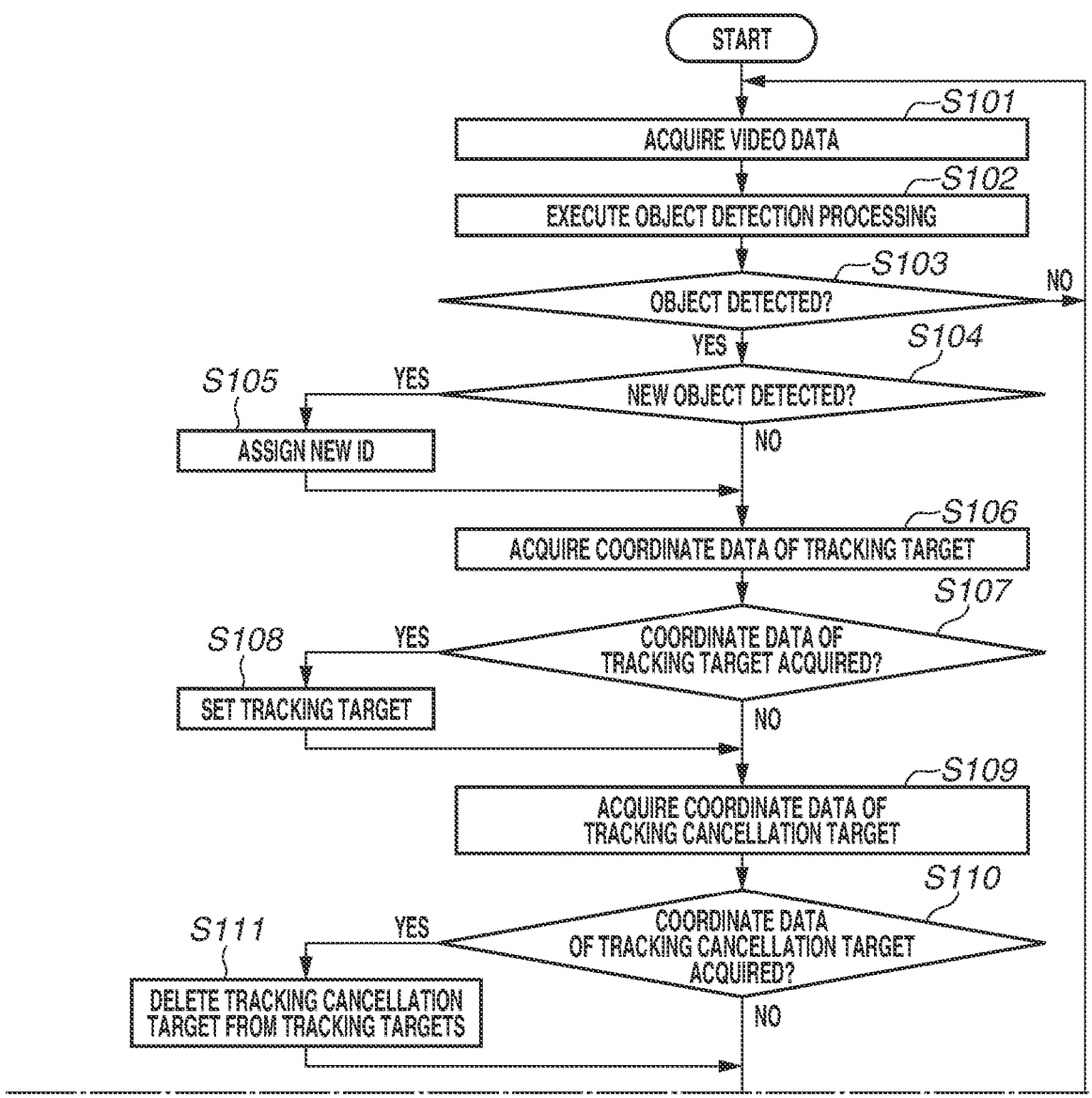
FIG. 5 (consisting of FIGS. 5A and 5B) is a flowchart illustrating a processing procedure performed by the automatic imaging system according to one or more aspects of the presently disclosure.
Figure 5B:
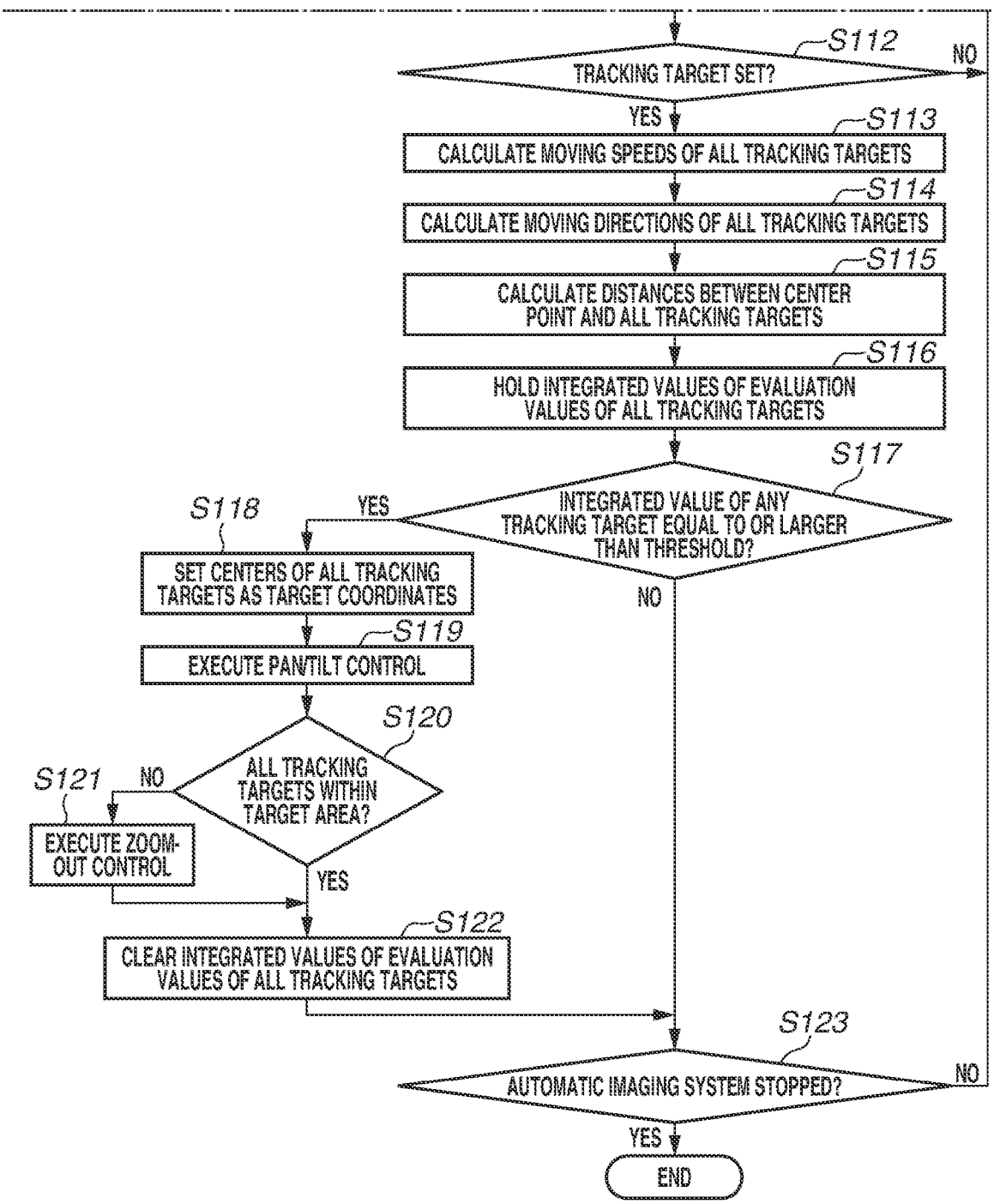

A procedure of the tracking processing performed by the automatic imaging system B1000 will be described with reference to the flowchart in FIG. 5.

The automatic imaging system B1000 is activated by a user operation. When automatic imaging processing is initiated, first, in step S101, the video input unit A1005 acquires video data from the video input apparatus A1001. Then, the processing proceeds to step S102.

In step S102, the object detection unit A1006 analyzes the video data input from the video input unit A1005, and executes processing for detecting an object in the video data. Then, the processing proceeds to step S103.

In step S103, the object detection unit A1006 determines whether an object is detected. When an object is detected (YES in step S103), the processing proceeds to step S104. When an object is not detected (NO in step S103), the processing returns to step S101.

In step S104, the object detection unit A1006 determines whether a new object, which has not been detected in the past, is detected. When a new object is detected (YES in step S104), the processing proceeds to step S105. When a new object is not detected (NO in step S104), the processing proceeds to step S106.

In step S105, the object detection unit A1006 assigns a new ID to the new detected object. Then, the processing proceeds to step S106.

In step S106, the tracking target selection unit B1007 acquires the coordinate data of a tracking target from the tracking target input unit A1012. Then, the processing proceeds to step S107.

In step S107, the tracking target selection unit B1007 determines whether the coordinate data of the tracking target is acquired from the tracking target input unit A1012. When the coordinate data of the tracking target is acquired (YES in step S107), the processing proceeds to step S108. When the coordinate data of the tracking target is not acquired (NO in step S107), the processing proceeds to step S109.

In step S108, the tracking target selection unit B1007 determines the object to be tracked, based on the coordinate data and ID information of the detected object(s) and the coordinate data of the tracking target acquired from the tracking target input unit A1012, and sets the determined object as the tracking target. Then, the processing proceeds to step S109.

In step S109, the tracking target selection unit B1007 acquires the coordinate data of a tracking cancellation target from the tracking target cancellation unit B1020. Then, the processing proceeds to step S110.

In step S110, the tracking target selection unit B1007 determines whether the coordinate data of the tracking cancellation target is acquired from the tracking target cancellation unit B1020. When the coordinate data of the tracking cancellation target is acquired (YES in step S110), the processing proceeds to step S111. When the coordinate data of the tracking cancellation target is not acquired (NO in step S110), the processing proceeds to step S112.

In step S111, the tracking target selection unit B1007 determines an object as the tracking cancellation target based on the coordinate data and ID information of the detected object(s) and the coordinate data of the tracking cancellation target acquired from the tracking target cancellation unit B1020, and deletes the determined object from the tracking targets. Then, the processing proceeds to step S112.

In step S112, the tracking target selection unit A1007 determines whether the tracking target is set. When the tracking target is set (YES in step S112), the processing proceeds to step S113. When the tracking target is not set (NO in step S112), the processing returns to step S101.

In step S113, the moving speed calculation unit A1008 calculates the moving speeds of all the tracking targets based on the coordinate data and ID information of all the tracking targets input from the tracking target selection unit B1007. The moving speed calculation unit A1008 further calculates the evaluation value X, which is used to control the drive control frequency, based on each of the moving speeds. Then the processing proceeds to step S114.

In step S114, the moving direction calculation unit B1015 calculates the moving directions of all the tracking targets based on the coordinate data and ID information of all the tracking targets input from the tracking target selection unit B1007. The moving direction calculation unit B1015 further calculates the evaluation value Y, which is used to control the drive control frequency, based on each of the moving directions. Then the processing proceeds to step S115.

In step S115, the center distance calculation unit B1016 calculates the distances from the center point to all the tracking targets based on the coordinate data and ID information of all the tracking targets input from the tracking target selection unit B1007. The center distance calculation unit B1016 further calculates the evaluation value Z, which is used to control the drive control frequency, based on each of the distances from the center point. Then, the processing proceeds to step S116.

In step S116, the drive control frequency determination unit B1009 calculates a total evaluation value by multiplying three types of information, which are the evaluation value X (moving speed evaluation value), the evaluation value Y (moving direction evaluation value), and the evaluation value Z (center distance evaluation value), and holds an integrated value of the total evaluation value. Then, the processing proceeds to step S117.

In step S117, the drive control frequency determination unit B1009 determines whether the integrated value of the total evaluation value of any of the tracking targets is equal to or larger than the threshold. When the integrated value of the total evaluation value of any of the tracking targets is equal to or larger than the threshold (YES in step S117), the processing proceeds to step S118. When the integrated value of the total evaluation value of each of the tracking targets is smaller than the threshold (NO in step S117), the processing proceeds to step S123.

In step S118, the target coordinate calculation unit B1017 sets the centers of coordinates of all the tracking targets as the target coordinates. Then, the processing proceeds to step S119.

In step S119, the pan/tilt drive control unit A1010 outputs the pan/tilt control command to the pan/tilt drive apparatus A1002 so as to execute the pan/tilt driving based on the target coordinates input from the target coordinate calculation unit B1017. More specifically, the pan/tilt drive control unit A1010 (control unit) controls the pan/tilt drive apparatus A1002 (drive apparatus or drive unit) in such a manner that the imaging direction of the video input apparatus A1001 (imaging apparatus) is changed following the movement of the object detected by the object detection unit A1006 (detection unit). Then, the processing proceeds to step S120.

In step S120, the zoom magnification calculation unit B1018 determines whether all the tracking targets can be positioned within a predetermined target imaging area (within a target area) based on the coordinate data of all the tracking targets and the tracking target coordinates input from the target coordinate calculation unit B1017. When all the tracking targets can be positioned within the target area (YES in step S120), the processing proceeds to step S122. When all the tracking targets cannot be positioned within the target area (NO in step S120), the processing proceeds to step S121.

In step S121, the zoom magnification calculation unit B1018 outputs the zoom magnification to the zoom drive control unit B1019, and zoom-out control is executed to achieve the target zoom magnification. Then, the processing proceeds to step S122.

In step S122, the drive control frequency determination unit B1009 clears the integrated values of the total evaluation values of all the tracking targets. Then, the processing proceeds to step S123.

In step S123, it is determined whether an unillustrated ON/OFF switch is operated by a user operation to stop the automatic imaging system B1000. When the switch is not operated (NO in step S123), the processing returns to step S101. When the switch is operated (YES in step S123), the operation of the automatic imaging system B1000 is terminated.

As described above, in the present exemplary embodiment, when the tracking target is less likely to move outside the viewing angle based on the movement information of the tracking target, the pan/tilt/zoom driving is controlled at a low frequency. As a result, the tracking target can be positioned at the center of the viewing angle while shake in a video image is reduced. When the tracking target is likely to move outside the viewing angle, the para/tilt/zoom driving is controlled at a high frequency. As a result, the possibility that the tracking target may move outside the viewing angle can be reduced.

While the exemplary embodiments of the present disclosure have been described above, the present disclosure is not limited to these exemplary embodiments, and various modifications and changes can be made within the scope of the gist of the present disclosure.

In the above exemplary embodiment, the description has been made of the example in which the video input apparatus A1001, the pan/tilt drive apparatus A1002, the tracking apparatus A1003, and the recording apparatus A1004 are configured independently. Alternatively, the video input apparatus A1001, the pan/tilt drive apparatus A1002, the tracking apparatus A1003, and the recording apparatus A1004 can appropriately be combined and configured as an integrated apparatus.

In the second exemplary embodiment, the description has been made on the example in which the total evaluation value is acquired based on the evaluation value X (moving speed evaluation value), the evaluation value Y (moving direction evaluation value), and the evaluation value Z (center direction evaluation value), Alternatively, the total evaluation value can be acquired based on one or two of the evaluation values X, Y, and Z.

A program (software) for executing a part or whole of the control according to the above-described exemplary embodiments of the present disclosure to implement the functions according to the exemplary embodiments may be supplied to an imaging apparatus or an information processing apparatus via a network or any of various storage mediums. Then, a computer (a CPU, a microprocessor unit (MPU) or the like) in the imaging apparatus or the information processing apparatus may load and run the program. In such a case, the program and the storage medium that stores the program constitute the present disclosure.

According to the above-described exemplary embodiments, a tracking target can be captured at the center of a viewing angle, and a video image can be captured in a composition in which the subject is easily visible.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (PAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-172188, filed Sep. 20, 2019, which is hereby incorporated by reference herein in its entirety.

What is claimed is:

1. A control apparatus comprising:
a control unit configured to perform control of a drive unit for an image capturing unit in such that an imaging direction of the image capturing unit is changed following a movement of an object detected from an image captured by the image capturing unit; and
a determination unit configured to determine a moving speed of the object,
wherein frequency of the control of the drive unit is controlled such that the faster the moving speed of the object is, the higher the frequency is.

2. The control apparatus according to claim 1,
wherein the determination unit determines whether an evaluation value which is based on the moving speed of the object is equal to or larger than a threshold, and
wherein, in a case where the determination unit determines that the evaluation value is equal to or larger than the threshold, the control unit performs the control of the drive unit.

3. The control apparatus according to claim 1,
wherein the detection unit detects a plurality of the objects from the image,
wherein the determination unit determines the moving speed about the movement for each of the plurality of the objects, and
wherein the control unit controls the drive frequency of the drive unit based on the moving speed determined for each of the plurality of the objects.

4. The control apparatus according to claim 1, further comprising a detection unit configured to detect the object from the image captured by the image capturing unit.

5. The control apparatus according to claim 1, further comprising a calculation unit configured to calculate an evaluation value based on the moving speed,
wherein the evaluation value is proportional to the moving speed, and the frequency of the control of the drive unit is proportional to the evaluation value.

6. A non-transitory recording medium readable by a computer and storing a program that causes the computer to function as:
a control unit configured to perform control of a drive unit for an image capturing unit such that an imaging direction of the image capturing unit is changed following a movement of an object detected from an image captured by the image capturing unit; and
a determination unit configured to determine moving speed of the object,
wherein frequency of the control of the drive unit is controlled such that the faster the moving speed of the object is, the higher the frequency is.

7. A method for controlling a control apparatus that changes an imaging direction of an image capturing unit, the method comprising:
performing control of a drive unit for the image capturing unit such that the imaging direction of the image capturing unit is changed following a movement of an object detected from an image captured by the image capturing unit; and
determining a moving speed of the object,
wherein frequency of the control of the drive unit is controlled such that the faster the moving speed of the object is, the higher the frequency is.

8. A control apparatus comprising:
a control unit configured to perform control of a drive unit for an image capturing unit such that an imaging direction of the image capturing unit is changed following a movement of an object detected from an image captured by the image capturing unit; and
a determination unit configured to determine a moving direction of the object,
wherein frequency of the control of the drive unit is controlled such that the larger an angle between the moving direction of the object and a direction from a position of the object in the image to a predetermined position in the image is, the higher the frequency is.

9. The control apparatus according to claim 8, wherein the predetermined position is corresponding to a center of the image.

10. The control apparatus according to claim 8, further comprising a detection unit configured to detect the object from the image captured by the image capturing unit.

11. The control apparatus according to claim 8, further comprising a calculation unit configured to calculate an evaluation value based on the moving direction of the object,
wherein the evaluation value is proportional to the angle between the moving direction of the object and a direction from the position of the object in the image to the predetermined position in the image, and the frequency of the control of the drive unit is proportional to the evaluation value.

12. A non-transitory recording medium readable by a computer and storing a program that causes the computer to function as:
a control unit configured to perform control of a drive unit for an image capturing unit such that an imaging direction of the image capturing unit is changed following a movement of an object detected from an image captured by the image capturing unit; and
a determination unit configured to determine a moving direction of the object,
wherein frequency of the control of the drive unit is controlled such that the larger an angle between the moving direction of the object and a direction from a position of the object in the image to a predetermined position in the image is, the higher the frequency is.

13. A method for controlling a control apparatus that changes an imaging direction of an image capturing unit, the method comprising:
performing control of a drive unit for the image capturing unit such that the imaging direction of the image capturing unit is changed following a movement of an object detected from an image captured by the image capturing unit; and determining a moving direction of the object, wherein frequency of the control of the drive unit is controlled such that the larger an angle between the moving direction of the object and a direction from a position of the object in the image to a predetermined position in the image is, the higher the frequency is.

\* \* \* \* \*